F. D. WEEKS.
POWER TRANSMITTING DEVICE.
APPLICATION FILED MAR. 2, 1911.
1,170,945.
Patented Feb. 8, 1916.
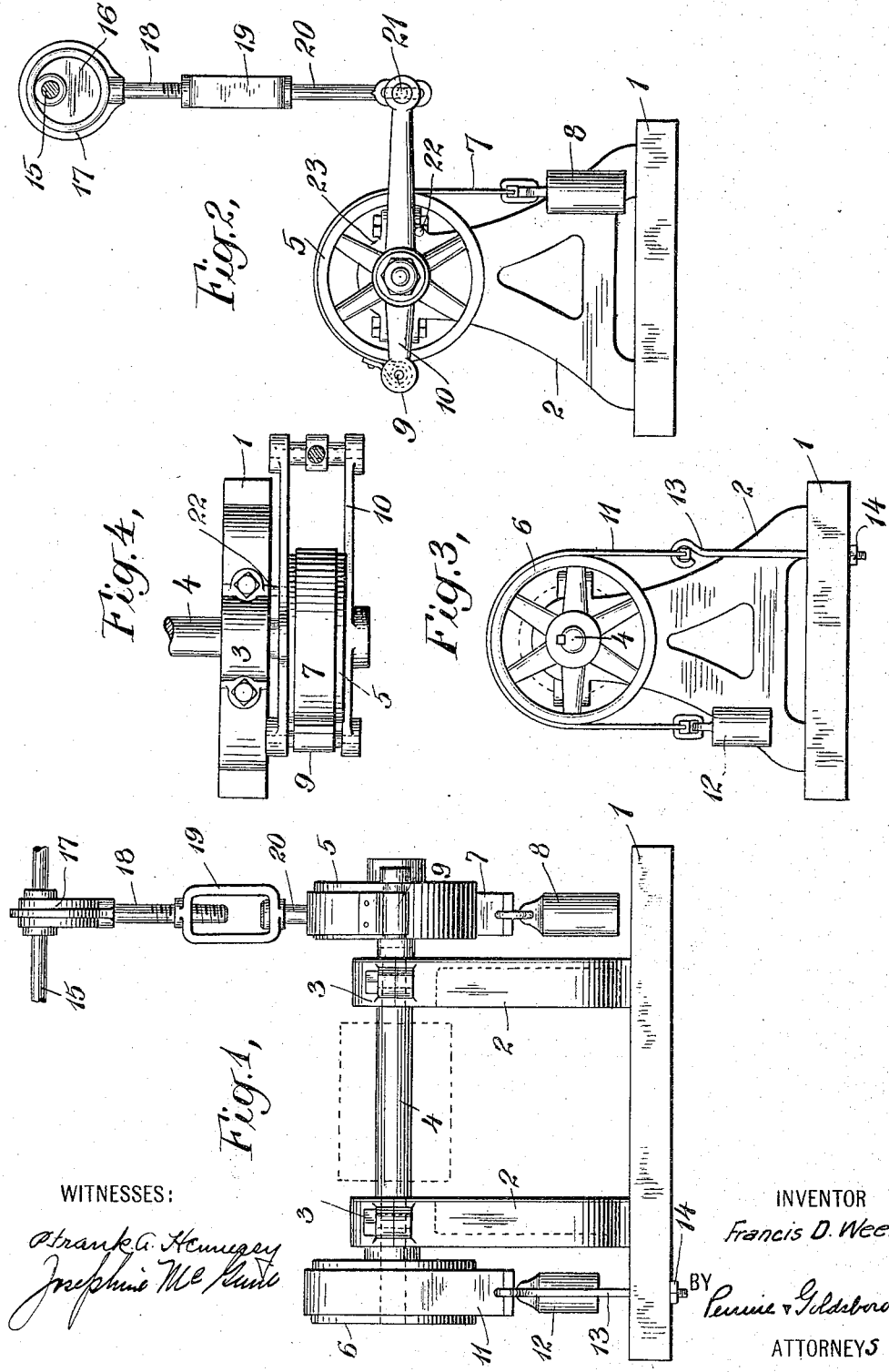
WITNESSES:
Frank G. Hennessey
Josephine McClure
INVENTOR
Francis D. Weeks
BY
Pennie & Goldsborough
ATTORNEYS

UNITED STATES PATENT OFFICE.

FRANCIS D. WEEKS, OF SALIDA, COLORADO, ASSIGNOR TO THE OHIO & COLORADO SMELTING & REFINING CO., OF DENVER, COLORADO, A CORPORATION OF COLORADO.

POWER-TRANSMITTING DEVICE.

1,170,945.  Specification of Letters Patent.  Patented Feb. 8, 1916.

Application filed March 2, 1911. Serial No. 611,795.

*To all whom it may concern:*

Be it known that I, FRANCIS D. WEEKS, a citizen of the United States, residing at Salida, county of Chaffee, State of Colorado, have invented certain new and useful Improvements in Power-Transmitting Devices; and I do hereby declare the following to be a full, clear, and exact description of the invention, such as will enable others skilled in the art to which it appertains to make and use the same.

The invention relates to transmitting devices in which reciprocating or continuous rotary motion is converted into intermittent linear or rotary motion. In devices heretofore employed for this purpose toothed racks, pawls and ratchets, or similar escapements were commonly used, with the result that the extent of the intermittent movement could only be varied in fine gradations by employing very small teeth, in consequence of which the teeth were correspondingly weak. Furthermore such devices were inherently rigid so that abnormal loads were liable to cause breakage of important parts unless those parts were made abnormally strong, in which case they were uneconomical of material.

In accordance with my invention the force is transmitted by frictional engagement between co-acting surfaces, so that the load is limited by slipping of the friction surfaces and breakage is avoided, and capacity for minute adjustment throughout a wide range is afforded.

In the accompanying drawings forming a part of this specification, and illustrating the preferred embodiment of my invention, Figure 1 is a front elevation of the transmitting device; Fig. 2 is an end elevation viewed from the driving end; Fig. 3 is an end elevation viewed from the brake end; Fig. 4 is a plan view of the driving end.

The base 1 supports the pedestals 2 with their bearings 3, through which the shaft 4 extends. Near the ends of the shaft are rigidly mounted the driving pulley 5 and the brake pulley 6. The driving strap 7 extends partly around the driving pulley and has a weight 8 suitably fastened to one end, while the other end is connected at 9 to a lever-frame 10 loosely pivoted on the shaft 4. The brake strap 11 extends partly around the brake pulley, and has the weight 12 attached to one end, while the other end is fastened to the base by means of the tie rod 13 and nut 14 screwed thereon. The rotating shaft 15 drives the eccentric 16 at constant speed. The rod 18 is secured at one end to the collar 17 which incloses the eccentric, while the other end is screwed into the turnbuckle 19. The other end of the turnbuckle carries a rod 20 which is connected to the lever 10 through a pin and slot connection at 21.

The operation of the mechanism illustrated is as follows: In this case the primary motion to be converted is a continuous rotary motion of shaft 15, which is converted by the eccentric 16 into a reciprocating motion of the connecting members 18, 19 and 20. It will be understood, however, that the primary motion may be a reciprocation corresponding to the movement of these members. By means of the adjustable connection 18, 19, 20 and 21 such reciprocating motion is converted into a minutely adjustable oscillation of the lever-frame 10, to which the strap 7 is connected at 9. The upward movement of the connection 9 is limited by the stop-pin 22 engaging the inner member of the lever-frame 10, and the downward movement of 9 is determined by the adjustment of the turnbuckle. During such downward movement the strap 7 is held in frictional engagement with the pulley 5 by the weight 8, and a counter-clockwise movement, as viewed in Fig. 2, of the pulley results, which imparts a corresponding movement, clockwise as viewed in Fig. 3, to the brake-pulley 6. The tendency of this movement of the brake-pulley is to lift the weight 12 and release the frictional engagement of the strap 11 therewith. This lifting of the weight 12 is very slight, only sufficient to slack the strap 11, but it is sufficient to permit the rotation of shaft 4 under the impulse of strap 7 on pulley 5. As the rod 20 begins to descend the lever-frame 10 falls and connection 9 rises, under the pull of weight 8, but now strap 11 is stretched tight on brake-pulley 6 and exerts sufficient braking effect thereon to prevent the reverse movement of shaft 4, and the strap 7 slips over pulley 5.

The angle through which the shaft 4 is turned during each cycle of rotation of the shaft 15, may be altered by adjusting the turnbuckle 19 on the threaded rod 18. It will be apparent that by screwing the turnbuckle up on the rod, the end of the slot will engage the pin at 21 throughout more of the cycle of rotation of the shaft 15, in consequence of which the shaft 4 will be rotated through a greater angle during each cycle. Similarly, as the turnbuckle is screwed down, the angle of movement of shaft 4 will be decreased during each cycle. By this means my device is capable of gradual adjustment throughout a wide range. Furthermore, the start of the intermittent rotary motion of the pulley 5 or shaft 4 relatively to the start of the cycle is altered by adjusting the turnbuckle, since the instant at which the end of the slot engages the pin at 21 in the upward movement of the vertical arm is advanced by screwing up the turnbuckle and delayed by screwing it down. Also the end of the intermittent rotary motion of the pulley 5 or the shaft 4 may be altered relatively to a point on the shaft 15 by advancing the eccentric, since the points of the extreme throw of the eccentric then occur at different points of the cycle.

I may mount on the shaft 4, preferably between the pedestals, a pulley (as indicated in dotted lines in Fig. 1) to convert the intermittent rotary motion of shaft 4 into intermittent linear motion in one direction of an endless belt or the like; or the intermittent linear motion produced may be used for any desirable purpose.

It will be understood from the foregoing description of a typical apparatus embodying my invention, that the invention is characterized by the employment of co-acting friction members interposed between the primary driving shaft 15 and the secondary driven shaft 4, mechanism for oscillating the driving friction member through an arc the extent of which is variable at will, the driven friction member being arranged to move with the driving member in one direction and not in the other, whereby the primary continuous rotary or reciprocating motion is converted into the intermittent rotary or linear motion. It will be apparent that for many purposes the strap 7 and pulley 5 illustrated as constituting the driving and driven friction members may be replaced in the proposed combination by equivalent friction devices of many different forms, and that there may be substituted for the brake strap and pulley any other suitable mechanism for restraining or removing the driving effect of the driving friction element upon the driven friction element in one direction.

What I claim is:

1. In a device for the conversion of motion, the combination of a primary driving mechanism rotating continuously and a secondary mechanism movable with intermittent rotary motion, coacting driving and driven friction members interposed between and connected respectively to the said continuously moving primary mechanism and the said intermittently moving secondary mechanism, the connection from the primary driving mechanism to the driving friction member including mechanism for converting the movement of said primary driving mechanism into an oscillation of the driving friction member, weighted means independent of the primary driving mechanism for imparting a limited pressure of engagement to the driving friction member during the advance movement, and mechanism for continuously holding the driven friction member against movement in the reverse direction, substantially as and for the purpose described.

2. In a device for converting continuous rotary motion of a primary driving mechanism into an intermittent rotary movement of a secondary mechanism, co-acting driving and driven friction members interposed between and connected respectively to the said primary and secondary mechanisms, the connection from the primary driving mechanism to the driving friction member including adjustable mechanism for converting the movement of said primary mechanism into an oscillation of variable and predetermined extent of the driving friction member, means independent of the primary driving mechanism for maintaining a substantially constant frictional engagement of the driving friction member on the driven friction member during the advance movement, and mechanism for holding the driven friction member against movement in the reverse direction, substantially as and for the purpose described.

3. In a device for converting continuous rotary motion of a primary driving mechanism into an intermittent movement of a secondary mechanism, a pulley connected to the secondary mechanism, a flexible strap engaging a part only of the circumference of said pulley, means for imparting a limited and constant pull on said strap, connections from the primary driving mechanism to the strap including mechanism for converting the rotary movement of said primary driving mechanism into an oscillation of the strap, and means for holding the pulley against movement by the strap in one direction, substantially as and for the purpose described.

4. In a device for converting continuous rotary motion of a primary driving mechanism into an intermittent rotary movement of a secondary mechanism, a pulley connected to the secondary mechanism, a strap in frictional engagement with said pulley, means for imparting a limited tension to said strap, connections from the primary driving mechanism to the strap including mechanism for converting the rotary movement of said primary driving mechanism into an oscillation of the strap and means for regulating the extent of that oscillation, a second pulley connected to the secondary mechanism, and a stationary strap in frictional engagement with said second pulley, said last named strap having a tensioning device at one end and being fastened at the other end to a fixed support, substantially as and for the purpose described.

5. In a transmitting device of the character described, a rotatable shaft, a pulley on said shaft, a flat flexible strap making a partial turn about said pulley, and in frictional engagement therewith, a weight for imparting a limited tension to said strap and limiting the grip of the strap on the pulley, a rock lever pivoted to said shaft to impart an oscillatory motion to said strap, and a second weighted strap for frictionally preventing movement of the pulley on the return swing of said rock lever, substantially as and for the purpose described.

6. In a transmitting device of the character described, a primary rotatable driving shaft, an eccentric on said shaft, a pivoted lever adjustably connected to said eccentric to be oscillated thereby, a second shaft, a pulley on said second shaft, a strap on said pulley and connected at one end to the pivoted lever, means for imparting a limited tension to said strap and limiting the friction of said strap on said pulley, and mechanism for preventing the movement of said pulley by said strap in one direction, substantially as and for the purpose described.

7. In a transmitting device of the character described, a primary rotatable driving shaft, an eccentric on said shaft, a pivoted lever, an adjustable slot and pin connection between the eccentric and said pivoted lever to vary the swing of the lever and to vary the time of its swing with respect to movement of the eccentric, a driven shaft, a pulley on said driven shaft, a weight, a strap on said pulley subjected to the constant pull of said weight, said strap being connected at one end to the pivoted lever, and stationary gripping mechanism for frictionally preventing movement of said pulley by said strap in one direction, substantially as described.

In testimony whereof I affix my signature, in presence of two witnesses.

FRANCIS D. WEEKS.

Witnesses:
WILLIAM H. DAVIS,
LEON W. ROSENTHAL.

Copies of this patent may be obtained for five cents each, by addressing the "Commissioner of Patents, Washington, D. C."